J. AULBACH.
Lamp Chandeliers.
No. 142,189. Patented August 26, 1873.
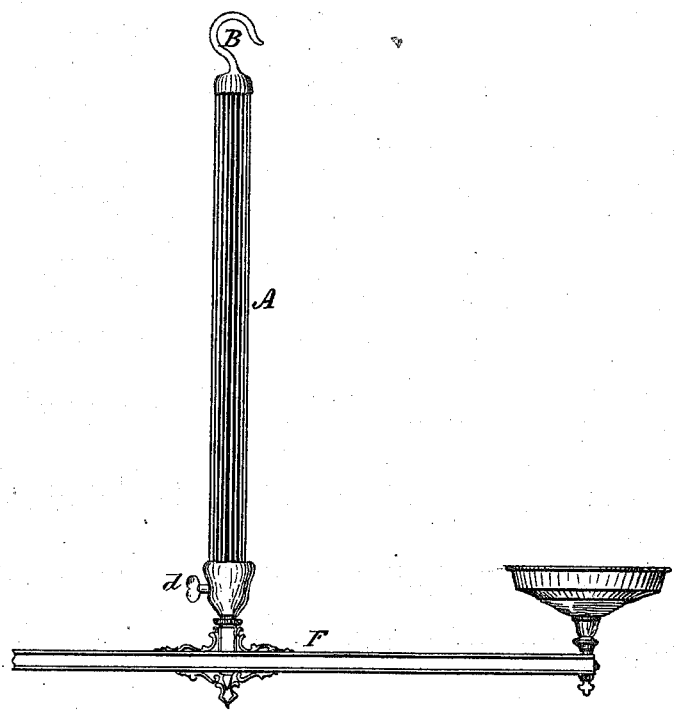
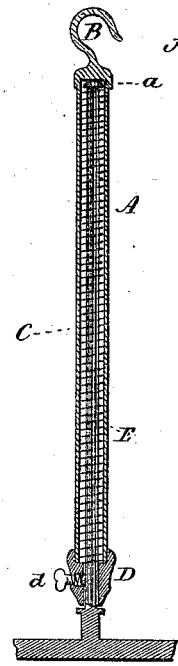

UNITED STATES PATENT OFFICE.

JOHN AULBACH, OF WEST MERIDEN, CONNECTICUT, ASSIGNOR OF ONE-HALF HIS RIGHT TO AUGUST PREGAMANN, OF SAME PLACE.

IMPROVEMENT IN LAMP-CHANDELIERS.

Specification forming part of Letters Patent No. 142,189, dated August 26, 1873; application filed July 30, 1873.

*To all whom it may concern:*

Be it known that I, JOHN AULBACH, of West Meriden, in the county of New Haven and State of Connecticut, have invented a new Improvement in Extension for Chandeliers; and I do hereby declare the following, when taken in connection with the accompanying drawings and the letters of reference marked thereon, to be a full, clear, and exact description of the same, and which said drawings constitute part of this specification, and represent, in—

Figure 1 a side view, and in Fig. 2 a vertical central section.

This invention relates to an improvement in that class of chandeliers designed to suspend kerosene-lamps, the object being to allow the branch which supports the lamps to be drawn down and supported at any desired elevation within certain defined limits; and it consists in the arrangement of a rod within a tube, the lamp or lamps attached to the said rod, and the tube suspended to the ceiling, the upper end of the said rod headed, and a spring coiled around the said rod and within the tube, and supported at its lower end, and so that when the rod is drawn down it will compress the spring, and combined with an adjustable friction upon the said rod, which will prevent the spring from drawing up the rod so soon as it shall have been freed from the power which drew it down, but yet will allow the spring to aid in drawing up the rod, so that but little power will be required to raise the rod and lamp attached.

A is a tube, provided with a hook, B, or other suitable device, by which it may be attached to the ceiling, and within this tube is arranged a rod, C, of less diameter than the interior of the tube, and the rod formed with a head, *a*, at its upper end. At the lower end of the tube a socket, D, is fitted, the rod C working freely therethrough, and between the socket D and the head *a* on the rod a wire-spring is coiled; hence when the rod is drawn down the spring will be compressed between the head *a* and the socket D, the reaction of the spring tending to draw the rod back with the tube. To the lower end of the rod the arm or arms F of the chandelier are attached. The strength of the spring should be sufficient to support the arm and lamps attached thereto. In order that the spring may not draw up the rod so soon as the power which draws it down is removed, I arrange a screw, *d*, through the socket D, bearing upon a pad between the end of the screw and the rod, so as to create a friction upon the rod sufficient to retain the rod and its attachments at any desired elevation, and yet allow the movement of the rod vertically by a slight amount of force applied to the arms.

I claim—

In a lamp-chandelier the combination of the tube A, the rod C within the tube provided with a head, *a*, the socket D at the lower end of the tube provided with the adjusting device *d* and the spring E around the said rod within the tube, between the head and the socket D, substantially as and for the purpose described.

JOHN AULBACH.

Witnesses:
E. A. MERRIMAN,
BENJ. PAGE, Jr.